(12) United States Patent
Imoto

(10) Patent No.: US 7,006,303 B2
(45) Date of Patent: Feb. 28, 2006

(54) CAMERA DEVICE

(75) Inventor: Masayoshi Imoto, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/101,434

(22) Filed: Apr. 8, 2005

(65) Prior Publication Data

US 2005/0225880 A1 Oct. 13, 2005

(30) Foreign Application Priority Data

Apr. 13, 2004 (JP) .............................. 2004-117516

(51) Int. Cl.
G02B 17/00 (2006.01)
G02B 5/04 (2006.01)
H04N 7/00 (2006.01)
H04N 7/18 (2006.01)
H04N 9/47 (2006.01)

(52) U.S. Cl. ...................... 359/726; 359/833; 348/118; 348/148

(58) Field of Classification Search ................ 359/726, 359/811, 831–834; 348/148, 118, 335, 337, 348/340
See application file for complete search history.

(56) References Cited

U.S. PATENT DOCUMENTS

2005/0057651 A1 * 3/2005 Imoto et al. ................. 348/148

* cited by examiner

*Primary Examiner*—Georgia Epps
*Assistant Examiner*—Alicia M Harrington
(74) *Attorney, Agent, or Firm*—Oliff & Berridge, PLC

(57) ABSTRACT

A light incident on one side surface of a prism is reflected twice between an inner surface of the other side surfaced of the prism and an inner surface of the one side surface of the prism. The reflected light is emitted from the rear surface of the prism to form an image on an image pickup element through the image pickup lens. A first reflective member disposed on a substantially entire other side surface of the prism totally reflects the light incident on the inner surface of the other side prism. A second reflective member disposed on an area, of the one side surface of the prism, in which the light incident on the inner surface of the one side prism is not totally reflected totally reflects the light incident on the inner surface of the one side prism.

8 Claims, 9 Drawing Sheets

CAMERA DEVICE

BACKGROUND OF THE INVENTION

1. Field of the Invention

The present invention relates to a camera device, and more particularly, to a camera device for taking images in a visual field perpendicular to an optical image-pickup axis using prisms.

2. Description of the Related Art

Conventionally, as a camera device, for example, a camera device as shown in FIGS. 3 and 9 is known. That is, the camera device 1, as shown in FIGS. 3 and 9, mainly includes an image pickup member having a single image pickup element 7 and an image pickup lens 9 arranged on a front side of the image pickup element 7, a two substantially triangular prisms 13 and 14 arranged in a left and right symmetry at a front side of the image pickup lens 9, and a wide lens 11 arranged at a front side of the image pickup lens 9.

The prism 13 (14) is arranged such that a rear surface 13B (14B) of the prism faces the image pickup lens 9 and the side surface 13L (14R) of the prism is disposed towards the visual field (herein a visual field in a left and right direction) in the direction substantially perpendicular to the optical image pickup axis. Substantially on the entire surface of the prism side surface 13R (14L) in the opposite visual field side of the prism 13 (14), a reflective film 20R (21L) for totally reflecting light CL (CR) incident on the inner surface of the prism side surface is provided.

With this construction, as shown in FIG. 9, the light CL (CR) from the visual field in the leftward (rightward) direction is incident on a prism 13 (14) side surface 13L (14R) in the visual field thereof, and is reflected twice between the inner surface of the side surface 13R (14L) of the prism 13 (14) in the opposite visual field side and the inner surface of the prism side surface 13L (14R) at the visual field side and emitted from a rear surface 13B (14B) of the prism to form an image on the image pickup element 7 through the image pickup lens 9. At the same time, as shown in FIG. 3, light CF from the visual field in the downwardly oblique direction at the front side forms an image on the image pickup element 7 through the wide lens 11 and the image pickup lens 9.

Accordingly, as shown in FIG. 11, the single image pickup element 7 provides the three visual fields such as the left and right visual fields and the visual field in the downwardly oblique direction at the front side are imaged at the same time (herein the visual field in the left and right direction is imaged on a left half area GL (right half area GR) of an upper half area Gu of an image pickup screen G2, and the visual field in a downwardly oblique direction at the front side is imaged on a lower half area Gd of the image pickup screen G2).

SUMMARY OF THE INVENTION

In the camera device 1, the visual fields in the leftward (rightward) direction is reflected on an inner surface of the side surface 13R (14L) of the prism in the side opposite to the prism 13 (14) in the visual field, and only the one that is totally reflected on an inner surface of the prism side surface 13L (14R) at the visual field side is emitted from the rear surface 13B (14B) of the prism to form an image on the image pickup element 7 through the image pickup lens 9, thereby providing an image.

As a result, as shown in FIG. 10 (only the prism 14 at the right side is illustrated in FIG. 10 for convenience sake), when there is light CL' (CR') that is not totally reflected on the inner surface of the prism 13 (14) side surface 13L (14R) in the visual field at the left (right) side and leaks out, a problem is caused that an ineffective picture portion (a portion on which an image is not provided) is generated on a portion (for example, a left edge portion GLL (a right edge portion GRR) of the upper half area Gu of the image pickup screen G2) corresponding to a portion (for example, a rear edge portion 13Lb (14Lb) of the prism side surface 13L (14L) in the visual field) of the prism side surface 13L (14R) at the visual field side that does not totally reflect the light, in a visual screen portion G1 (gr) of the image pickup screen G2 as shown in FIG. 11.

In order to solve the problem, with reference to FIG. 4 (the prism 14 at the right is not illustrated in FIG. 4) it is preferable that an arrangement angle δ of the prism 13 (14) (more specifically, the angle between the side surface 13R (14L) of the prism at the opposite visual field side and a virtual vertical plane S2 perpendicular to an optical image pickup axis P1) is adjusted, so that an incident angle c (this incident angle c is given by following equation 1) of the light CL (CR) incident on the inner surface of the prism 13 (14) side surface 13L (14R) in the visual field at the left (right) have a total reflection condition (following equation 2).

$$C = \beta - \sin^{-1}\{1/n \sin(H_0 + \delta - \gamma)\} \quad (1)$$

$$C > \sin^{-1}(1/n) \quad (2)$$

In FIG. 4 and the equation 1, angle $H_0$ indicates an angle between the optical image pickup axis P1 and the direction of light emitted from the rear surface 13B (14B) of the prism. Further, angle γ indicates an angle between the side surface 13R (14L) of the prism in an opposite visual field side of the prism 13 (14) and the rear surface 13B (14B) of the prism. Furthermore, the n in the equation 2 indicates a refraction index of the prism 13 (14).

That is, it is desirable that the angle δ is adjusted to be small in order to solve the problem, since angle c becomes large and the light CL (CR) is easily reflected on the inner surface of the side surface 13R (14L) of the prism at the visual field side when the angle δ has a small value in the equations 1 and 2.

However, when the angle δ is small, as shown in FIG. 12, a portion R (L) corresponding to a vertex angle portion 13a (14a) is moved to the direction of a left (right) end of the image pickup screen G3, such that the visual range at the left (right) side imaged on the image pickup screen G3 becomes narrow.

Accordingly, it is an advantage of the present invention to provide a camera device for taking an image in a visual field substantially perpendicular to an optical image pickup axis to prevent the narrowing of a visual range at a left (right) side of the image on an image pickup screen and an the generation of an ineffective picture portion formed by not totally reflecting the light in a prism within the visual range of the image on the image pickup screen.

According to a first aspect of the present invention, a camera device includes: an image pickup member having an image pickup element and an image pickup lens disposed on a front side of the image pickup element: and at least one substantially triangular prism disposed on a front side of the image pickup member, each prism having a rear surface facing the image pickup lens, one side surface disposed toward a visual field side in a direction substantially perpendicular to an optical image pickup axis, and the other side surface disposed toward an opposite visual field side. A light incident on the one side surface of prism is reflected twice between an inner surface of the other side surfaced of the prism and an inner surface of the one side surface of the prism. The reflected light is emitted from the rear surface of the prism to form an image on an image pickup element through the image pickup lens. A first reflective member disposed on a substantially entire other side surface of the prism totally reflects the light incident on the inner surface of the other side prism. A second reflective member disposed on an area, of the one side surface of the prism, in which the light incident on the inner surface of the one side prism is not totally reflected totally reflects the light incident on the inner surface of the one side prism.

By thus configuration, substantially on an entire surface of the prism side surface in the opposite visual field side, the first reflective member for totally reflecting the light incident on the inner surface of the substantially entire surface of the prism side surface is provided and, on the area in which the light incident on the inner surfaces of the surfaces of side surfaces of the prisms is not totally reflected, a second reflective member for totally reflecting the light incident on the inner surfaces of the areas are provided on one of side surfaces of the prism at the visual field side Accordingly, the first reflective member and the second reflective member allows light to be totally reflected on the entire inner surfaces of the both side surfaces of the prism at the visual field side and in the opposite visual field side irrespective of an arrangement angle of the prism. Accordingly, the image in the visual field substantially perpendicular to the optical image pickup axis is provided such that the visual range of an image on the image pickup screen G3 is not narrow and an ineffective picture portion formed by not totally reflecting the light in the prism within the visual range of the image on the image pickup screen is not generated.

According to a second aspect of the invention, the second reflective member is formed on a rear edge area of the one side of the prism.

Since the second reflective member is formed on the rear edge area of the prism side surface at the visual field side, the light incident on the inner surface of the prism side surface at the visual field side can be reflected totally.

According to a third aspect of the invention, the second reflective member is a reflective film formed on the one side of the prism.

By thus configuration, the second reflective member is a reflective film formed on the prism side surface at the visual field side. Accordingly, the second reflective member can have a simple construction.

According to a fourth aspect of the invention, the second reflective member has a reflective film formed on a surface of a base material. The reflective film is adhered to the one side of the prism.

According to a fifth aspect of the invention, the at least one prism is configured by two prisms. The two prisms are arranged in a plane symmetry with respect to a virtual plane including the optical camera axis of the image pickup member. The light incident from visual fields substantially opposite to each other imaged on the image pickup element through the image pickup lens by the two prisms.

By thus configuration, two prisms are arranged in a plane symmetry with respect to the virtual plane including the optical camera axis of the image pickup member and, by means of the prisms, the lights from visual fields positioned in directions substantially opposite to each other form images on the image pickup element through the image pickup lens. Therefore, with an inexpensive construction employing a single image pickup element, visual fields positioned opposite to each other are allowed to be imaged simultaneously.

According to a sixth aspect of the invention, the image pickup member focuses light guided by the prism from the visual field in a direction substantially perpendicular to an optical image pickup axis simultaneously with incident light that has not passed through the prism from the visual field at a front side of the image pickup member, on the image pickup element through the image pickup lens.

According to a sixth aspect of the present invention, the image pickup member focuses the light guided by the prism from the visual field in the direction substantially perpendicular to the optical image pickup axis simultaneously with incident light that has not passed through the prism from the visual field at the front side of the image pickup member, on the image pickup element through the image pickup lens. As a result, with an inexpensive construction employing a single image pickup element, the visual field in the direction substantially perpendicular to the optical image pickup axis and the visual field at the front side of the image pickup member are allowed to be imaged simultaneously.

The light from the visual field in the direction substantially perpendicular to the optical image pickup axis is reflected twice between the inner surfaces of the prism so that a non-reverse image can be formed on the image pickup element. Thus, the image in the visual field in the direction substantially perpendicular to the optical image pickup axis and the image in the visual field at the front side of the image pickup member are matched to have the same directions to form images. Accordingly, it is possible to omit a complicated image process in which a partial image reversing process to an image pickup screen is performed after an image is picked up.

According to a seventh aspect of the invention, the camera device is arranged at an end of a vehicle. The camera device takes a peripheral image of the vehicle.

Since the camera device is arranged at the end of a vehicle for taking surrounding images of the vehicle. Therefore, it is possible to pickup the surrounding images of the vehicle so that the visual range of the images on the image pickup screen is not narrow and the ineffective picture portion formed by not totally reflecting the light in the prism within the visual range of the image on the image pickup screen is not generated.

DESCRIPTION OF THE PREFFERED EMBODIMENTS

Figure 1:
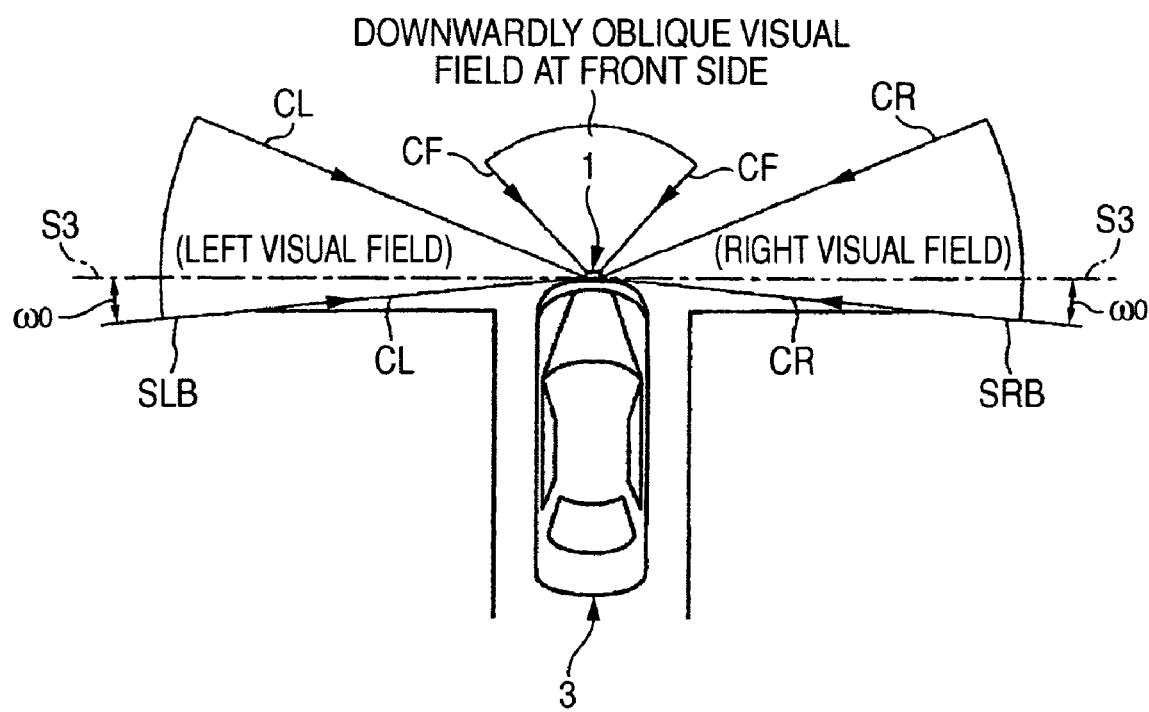
FIG. 1 is a view illustrating an exemplary embodiment of a state in which a camera device according to one embodiment of the invention is mounted and a visual field range of the camera device in the mounted state.

A camera device 1 according to one embodiment is, as shown in FIG. 1, for example, mounted on the front end portion of a lower portion of an emblem located at the front side of a vehicle 3 to be allowed to simultaneously pickup three images including a two visual fields in opposite side directions of surrounding the vehicle (here left and right visual fields) and an image for a visual field in a front direction (here a visual field in a downwardly oblique direction at the front side). The camera device 1 has, as shown in FIGS. 2 and 3, a single image pickup element 7, an image pickup lens 9 disposed on a front side of the image pickup element 7, a wide lens 11 arranged on a front side of the image pickup lens 9, and at least one (herein, two) substantially triangular prisms 13 and 14 disposed on the front side of the image pickup lens 9 accommodated in an opaque case 5.

Figure 2:
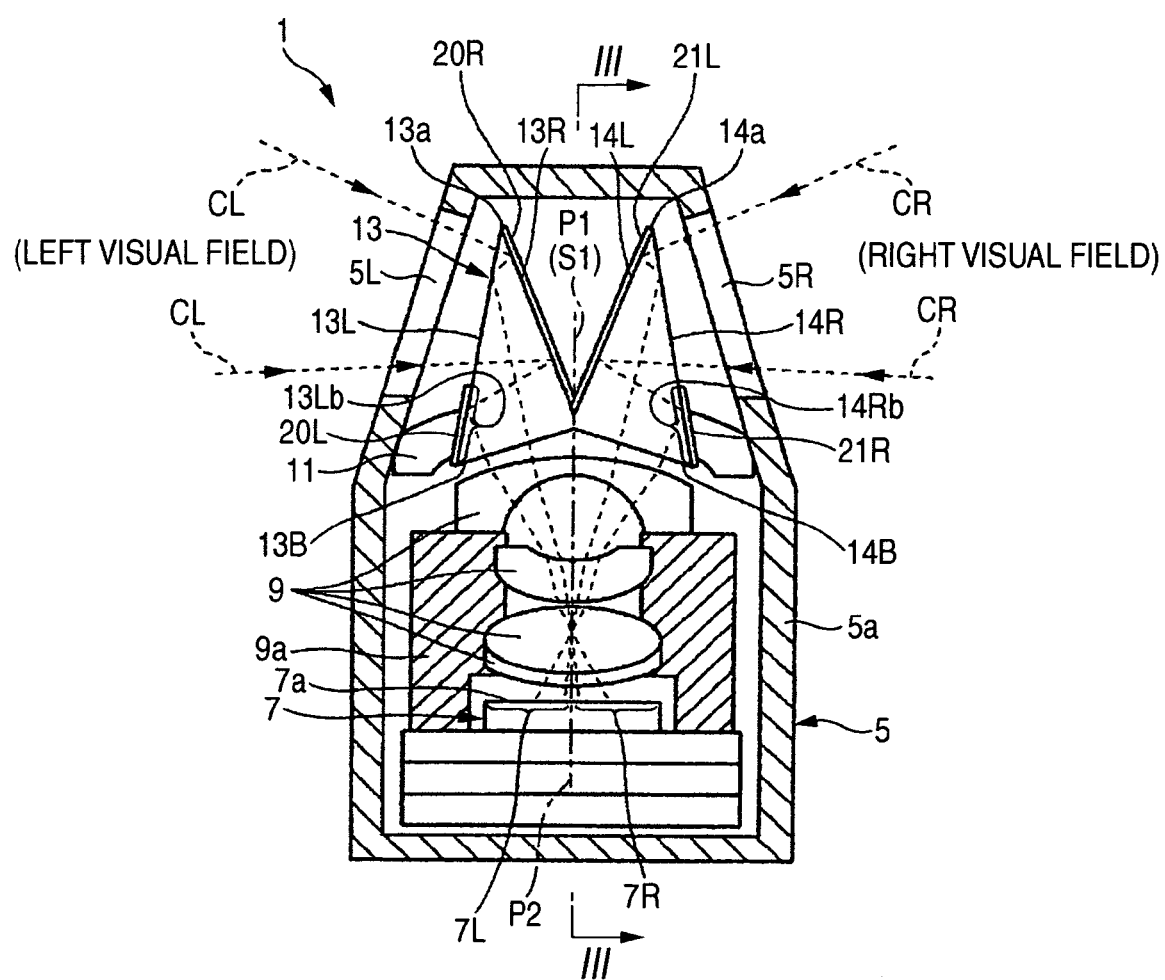
FIG. 2 is a schematic configuration view taken by viewing the camera device from the top.

The case 5 includes, as shown in FIGS. 1 and 2, a case body 5a having a shape of a box formed by an opaque member, and transparent windows 5L, 5R and 5F formed by transparent members on left and right sides (more specifically side surfaces of left and right visual field sides of the vehicle 3) and on a lower surface of the case body 5a are provided. A front half portion of the left and right side surfaces and a front half portion of the lower surface of the case body 5a are oblique towards inner side of the case 5 by facing a front end side of the case 5, and the front half portion of the left and right side surfaces and the front half portion of the lower surface formed obliquely are provided with the transparent windows 5L, 5R the 5F.

Figure 3:
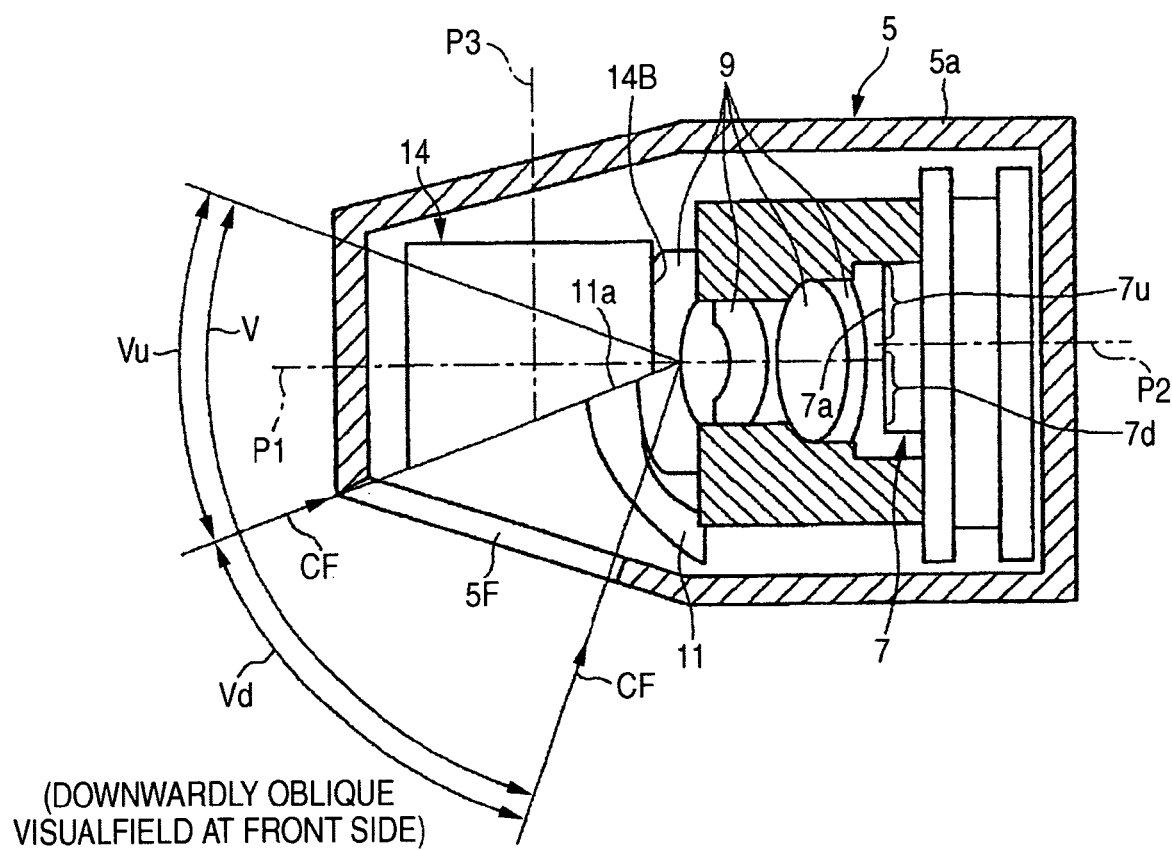
FIG. 3 is a cross sectional view taken along the line III—III in FIG. 2.

The image pickup element 7 has, as shown in FIG. 3, for example an image pickup surface 7a maintained perpendicular to the image pickup element 7 simultaneously with the image pickup surface 7a arranged to be deviated relatively upward from the image pickup lens 9. Therefore, the light CF from the visual field in the downwardly oblique direction at the front side is appropriately imaged on the image pickup surface 7a.

As shown in FIGS. 2 and 3, the image pickup lens 9 is, for example, configured by a complex lens, and is incorporated into a holder 9a to be assembled as a single lens. The image pickup lens 9 has an optical axis P1 (an optical axis for image pickup) thereof disposed so as to be in parallel with a center axis P2 perpendicular to the image pickup surface 7a of the image pickup element 7.

Further, the image pickup member includes the component elements 7, 9, and 9a.

The wide lens 11 has a substantially upper half portion of the concave lens (a wide-angle lens) such as a negative meniscus lens or the like cut out to be in the form of a substantially half-moon defined by the other remaining substantially half portion. As shown in FIG. 3, the wide lens 11 has a cut out portion 11a thereof arranged to face the optical axis P1 side of the image pickup lens 9, for example to be limited within a substantially lower half area Vd of a vertical visual field angle V of the image pickup lens 9. This wide lens 11 allows the visual field angle in a downwardly oblique direction at the front side in the camera device 1 to be widened up to immediately near the front side of the camera device 1.

The prism 13 (14) has, as shown in FIGS. 2 and 3, a rear surface 13B (14B) facing to the image pickup lens 9 with a pillar axis P3 held perpendicular to the optical axis, and one side surface 13L (14R) is arranged to proceed to the left (right) visual field (a visual field in a direction substantially perpendicular to the optical axis P1 for image pickup) passing through the left (right) sided transparent window 5L (5R) of the case 5. Further, each of the prisms 13 and 14 is arranged in a plane symmetry each other with respect to a first vertical virtual plane S1 (a virtual plane) including an optical axis P1 of the image pickup lens 9.

Figure 4:
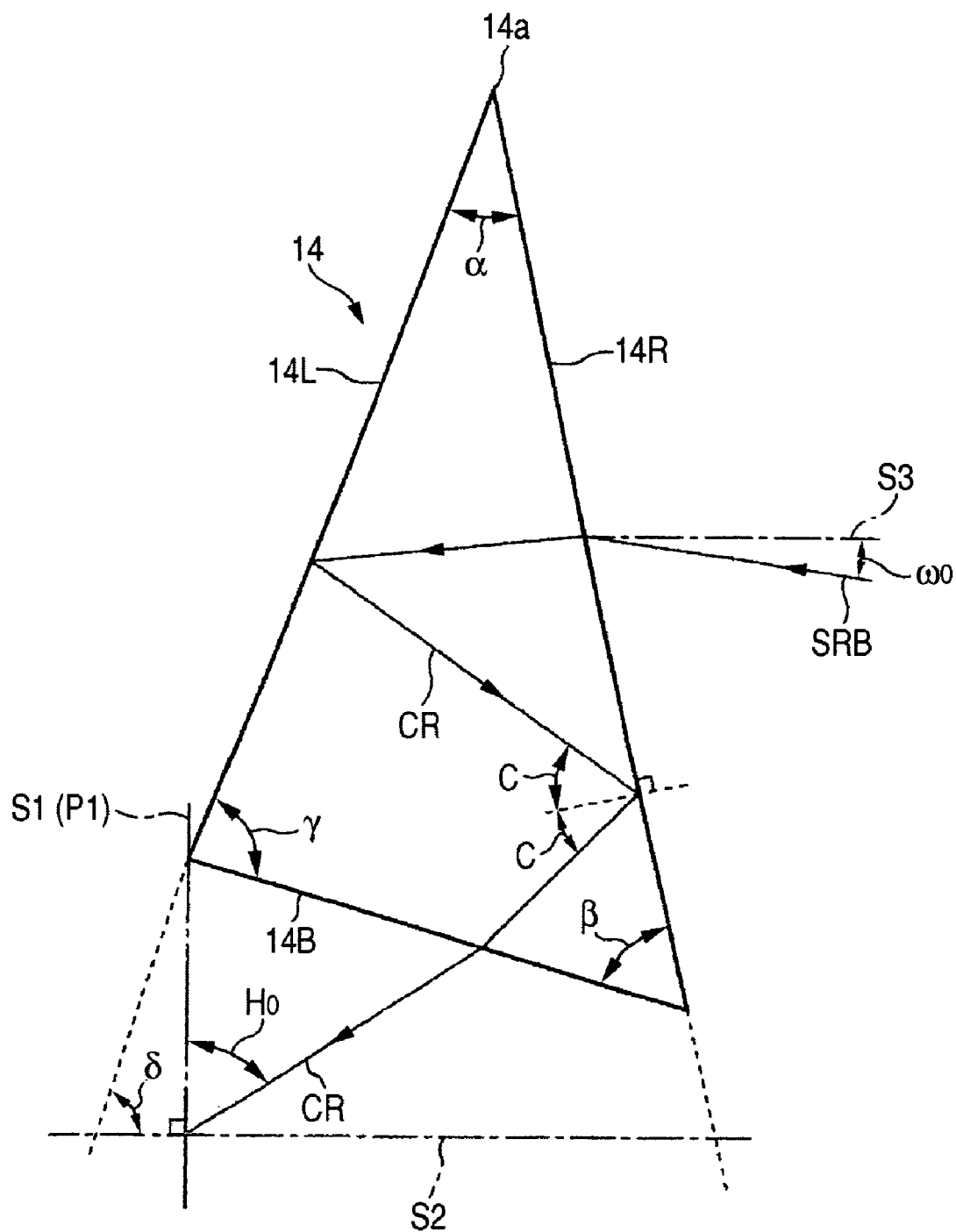
FIG. 4 is a view explaining a relationship among angles $\alpha$, $\beta$ and $\gamma$ between individual prism side surfaces in FIG. 2, an arrangement angle $\delta$ of a prism, an angle which light is incident on an inner surface of a prism side surface 14R, and a horizontal visual field angle $H_0$ of an image pickup lens.

Here, in the prism 13 (14), as shown in FIG. 4 (only the prism 14 at the right side is illustrated in FIG. 4 for convenience sake), it is assumed as an angle β between a prism side surface 13L (14R) in the visual side and a rear surface 13B (14B) of the prism, an angle γ between a side surface 13R (14L) of the prism in a side opposite to the visual field in the visual side and the rear surface 13B (14B) of the prism, an angle δ between a side surface 13R (14L) of the prism in a side opposite to the visual field at the visual field side and a second vertical virtual plane S2 perpendicular to the first vertical virtual plane S1 including the optical axis P1 of the image pickup lens 9, an angle $w_0$ (however, it is assumed that a direction of the angle rotating towards a front side (rear side) of the third vertical virtual plane S3 is positive (negative)) between a rear end limit line SLB (SRB) of a horizontal visual field angle of the prism side surface 13L (14R) on the visual field and a third vertical virtual plane S3 perpendicular to the first vertical virtual plane S1, a refraction rate n of a glass member (BK7) of the prism 13 (14), and a half horizontal visual field angle $H_0$ of the image pickup lens 9 are respectively set as α=30.6°, β=55.2°, γ=94.2°, δ=85.8°, $H_0$=42°, n=1.517. Here, the angle δ (an arrangement angle of each of the prism 13, 14) is set such that portions R, L corresponding to a vertex angle portion 13a, 14b of the prism 13, 14 on an image pickup screen G1 of the image pickup element 7 approach a center of an upper half portion GL, GR on the image pickup screen G1.

In addition, each of the prisms 13 and 14 is limited within a substantially upper half portion Vu of the vertical visual field angle V of the image pickup lens 9 (more specifically, a portion protruded into the substantially lower half area Vd of the vertical visual field angle V of the image pickup lens 9 in a lower portion of each of the prisms 13 and 14 is cut out) to be arranged.

On a substantially entire surface of a prism side surface 13L (14R) in a side opposite to the visual field of the prism 13 (14), a first reflective member 20R (21L) for totally reflecting the light CL (CR) incident on inner surface of the prism is provided. The first reflective member 20R (20L) includes a reflective film made of a metal such as an aluminum deposited on a side surface 13R (14L) of the prism in a side opposite to the visual field of the prism 13 (14).

Further, of the prism side surface 13L (14L) on the visual field side of the prism 13 (14), on an area (here, a rear edge area 13Lb (14Rb) of a prism side surface 13L (14R) in the visual field) where the light CL (CR) incident on the inner surface of the prism is not totally reflected, a second reflective member 20L (21R) is provided for totally reflecting light incident on an inner surface of the area thereof with covering the area.

The second reflective member 20L (21R) has a reflective film formed by deposition of a metal such as aluminum on a prism side surface 13L (14R) in the visual field of the prism 13 (14). That is, it is desirable that the rear edge area 13Lb (14Rb) of the prism side surface 13L (14R) is exposed and at the same time masking is performed to an area except the rear edge area, in this state, a metal such as aluminum is deposited on the prism side surface 13L (14R), and the masking is removed.

Figure 5:
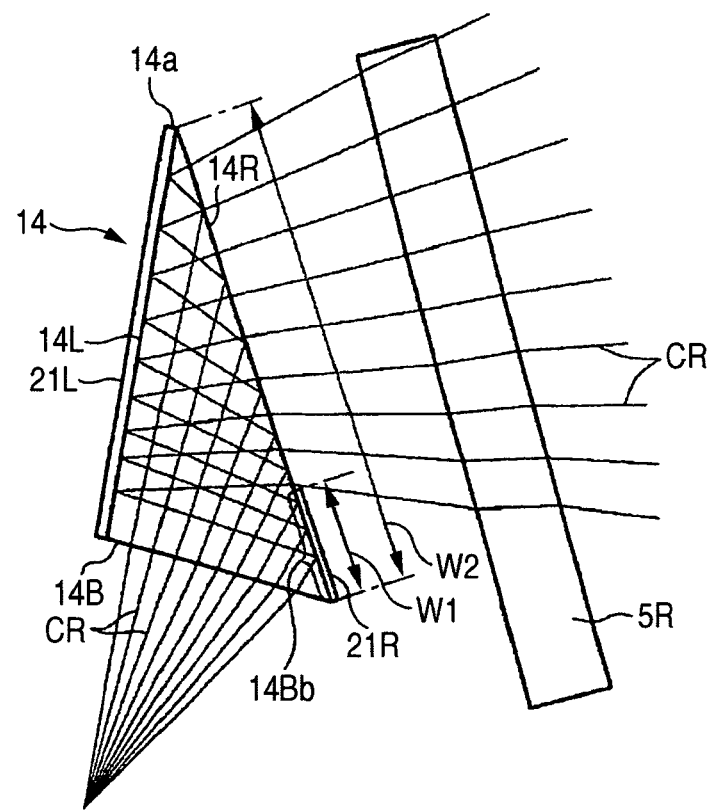
FIG. 5 is a view illustrating an example showing a state in which light incident on an inner surface of the prism side surface by the second reflective member in the camera device in FIG. 2 is totally reflected.

Referring FIG. 5 (only the prism 14 at the right side is illustrated in FIG. 5 for convenience sake), a width W1 of the second reflective member 20L (21R) is formed, for example, as W1=2.3 mm in case that a cross width W2 of the prism side surface 13L (14R) at the visual field side is, for example, set as W2=11.9 mm.

With this construction, as shown in FIG. 2, the light CL (CR) from a left (right) visual field (that is, a left (right) visual field of the surrounding the vehicle) of the camera device 1 passes through the transparent window 5L (5R) of the case 5 and is incident on a prism side surface 13L (14R) in the left (right) visual field of the prism 13 (14) at the visual field side. Then the light CL (CR) is totally reflected on an entire inner surface of the side surface 13R (14L) of the prism in the opposite visual field side by the first reflective member 20R (21L) and is totally reflected on an entire inner surface of the side surface 13L (14R) of the prism at the visual field side by the second reflective member 20L (21R) and emitted from a rear surface 13B (14B) of the prism to form an images as an upright images on an a left (right) half area 7R (7L) of a lower half area 7d in an image pickup surface 7a of the image pickup element 7 through the image pickup lens 9.

As shown in FIG. 3, the light CF from a visual field (that is, the visual field in a downwardly oblique direction of the front side in the vicinity of the vehicle) in a downwardly oblique direction at the front side in the camera device 1 passes through the transparent window 5F of the case 5 to form an images as an upright images on of an upper half area 7u in an image pickup surface 7a of the image pickup element 7 through the wide lens 11 and the image pickup lens 9 without passing through the prisms 13 and 14.

As described above, the three visual fields such as the left and right visual fields in the vicinity of the vehicle and the visual field in a downwardly oblique direction at the front side are imaged by the single image pickup element 7 at the same time. The image pickup screen G1 of the image pickup element 7 is, as shown in FIG. 6, processed to be totally reversed so that the left (right) visual field (that is, a left (right) visual field of the camera device 1) in the vicinity of the vehicle is imaged into a picture as an upright image on a left (right) half area GL (GR) of the upper half area Gu, and the visual field (that is, the visual field in a downwardly oblique direction of the camera device) in the downwardly oblique direction of the front side in the vicinity of the vehicle.

Further, in the image pickup screen G1, portions R and L corresponding to the vertex angle portion 13a and 14a of the prisms 13 and 14 approach a center of the upper half area Gu in the image pickup screen G1 to be imaged, whereby ranges of the left and right visual fields imaged on the image pickup screen G1 (ranges where the left and right visual field image portions G1 and G2 are imaged) are secured to have a sufficient width without being narrowed.

Furthermore, in the image pickup screen G1, the second reflective member 20L (21R) is provided so that the light CL (CR) is totally reflected on an entire inner surface of the both of the side surfaces 13L and 13R (14L and 14R) of the prism. Therefore, an ineffective picture portion formed by not totally reflecting the light CL (CR) in the prism 13 (14) within a visual range imaged on the image pickup screen is not generated on the left and right visual image portions Gr and G1.

Figure 6:
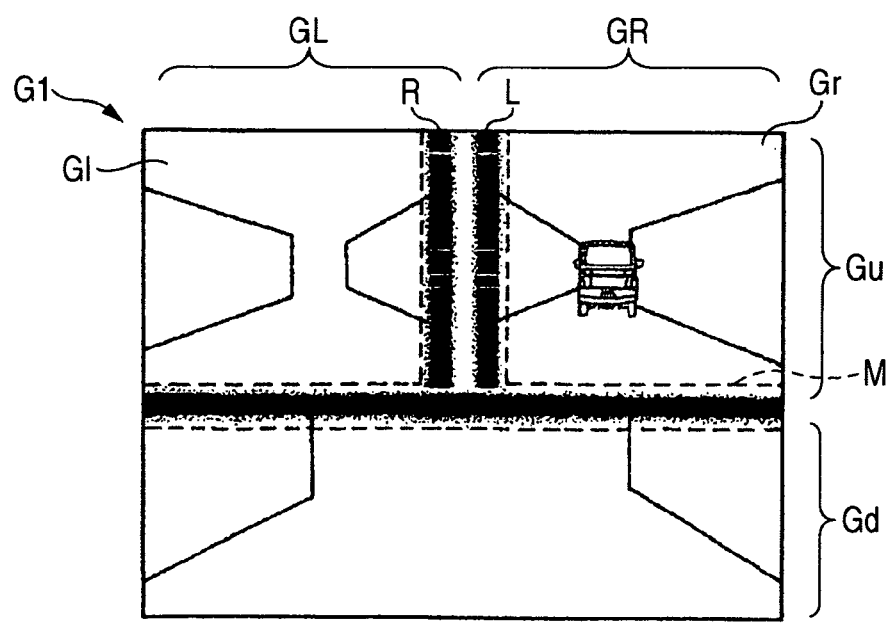
FIG. 6 is a view illustrating an example of an image pickup screen of an image pickup element in the camera device in FIG. 2.

Moreover, the image pickup screen G1 of the image pickup element 7 is displayed on a predetermined vehicle-mounted monitor as shown in FIG. 6, or a predetermined image recognition process is performed so that a result of the process is used in a device for supporting driving of a driver. When, the image pickup screen G1 is displayed on the predetermined vehicle-mounted monitor, boundary line masks (not shown) are overlaid on a dotted line area M of the image pickup screen G1 by a predetermined image pickup process portion.

According to the camera device 1 as explained above, on a substantially entire surface of the side surface 13R (14L) of the prism, the first reflective member 20R (21L) for totally reflecting the light CL (CR) incident on an inner surface thereof is provided, and on an area where the light CL (CR) incident on the inner surface thereof is not totally reflected, of the side surface 13L (14R) of the prism in the visual side of the prism 13 (14), the second reflective member 20L (21R) for totally reflecting the light CL (CR) incident on an inner surface of the area is provided. Accordingly, the first reflective member and the second reflective member 20R (21L) and 20L (21R) allow the light CL (CR) to be reflected on an entire inner surface of both of the prism side surface 13L and 13R (14L and 14R) at the visual field side and in the opposite visual field side without depending on the arrangement angle δ of the prism 13 (14), whereby a visual fielding a direction substantially perpendicular to the optical image pickup axis P1 (here a left (right) visual field) can be imaged such that a visual range imaged on the image pickup screen G1 is not narrow and an ineffective picture portion formed by not totally reflecting the light CL (CR) in the prism 13 (14) within a visual range imaged on the image pickup screen is not generated.

Further, since the second reflective member 20L (21R) is formed on the rear edge area 13Lb (14Rb) of the prism side surface 13L (14R) in the visual field, the light CL (CR) incident on an inner surface of the rear edge area 13Lb (14Rb) of the prism side surface 13L (14R) in the visual field is ensured to be totally reflected.

Furthermore, the second reflective member 20L (21R) configured by a reflective film formed on the prism side surface 13L (14R) in the visual field can result in a simple construction.

In addition, two prisms 13 and 14 are arranged in a plane symmetry with respect to a virtual plane S1 including an optical image pickup axis P1 of the image pickup member 7, 9 and 9a, and the light CL (CR) from visual fields positioned substantially opposite to each other (here left and right visual fields) is imaged on the image pickup element 7 through the image pickup lens 9 by the prism 13 (14).

Therefore, with an inexpensive construction employing a single image pickup element 7, visual fields positioned opposite to each other are allowed to be imaged simultaneously.

Moreover, the lights CL and CR from the visual field substantially perpendicular to the optical image pickup axis P1 (here left and right visual fields) is imaged on the image pickup element 7 through the image pickup lens 9 simultaneously with the light CF from the visual field of the front side of the image pickup member 7, 9 and 9a (the visual field in the downwardly oblique direction of the front side) incident without passing through the prism 13 and 14. Thus, with an inexpensive construction employing a single image pickup element 7, the visual field in a direction substantially perpendicular to an optical image pickup axis P1 (here left and right visual fields) is allowed to be imaged simultaneously with the visual field at a front side of the image pickup member 7, 9 and 9a (here a visual field in a downwardly oblique direction at the front side).

Further, the light CL and CR from a visual field in a direction substantially perpendicular to an optical image pickup axis P1 is respectively reflected on twice between inner surfaces of the prism 13 and 14 so that an image can be formed on the image pickup element 7 without having a reverse image. Thus, an image in the visual field in a direction substantially perpendicular to the optical image pickup axis P1 and an image in the visual field at a front side of the image pickup member 7, 9 and 9a are matched to have same directions to form images. Accordingly, it is possible to omit a complicated image process in which a partial image reversing process to an image pickup screen G1 is performed to match the directions of the images after an image is picked up.

Furthermore, the camera device 1 is arranged at an end of a vehicle 3 to image an image surrounding the vehicle 3. Accordingly, it is possible to take an image surrounding the vehicle such that a visual range imaged on the image pickup screen G1 (particularly left and right visual field ranges) is not narrow and an ineffective picture portion formed by not totally reflecting the light CL (CR) in the prism 13 and 14 within a visual range imaged on the image pickup screen G1 (particularly left and right visual field ranges) is not generated.

<A Modified Embodiment>

Figure 7:
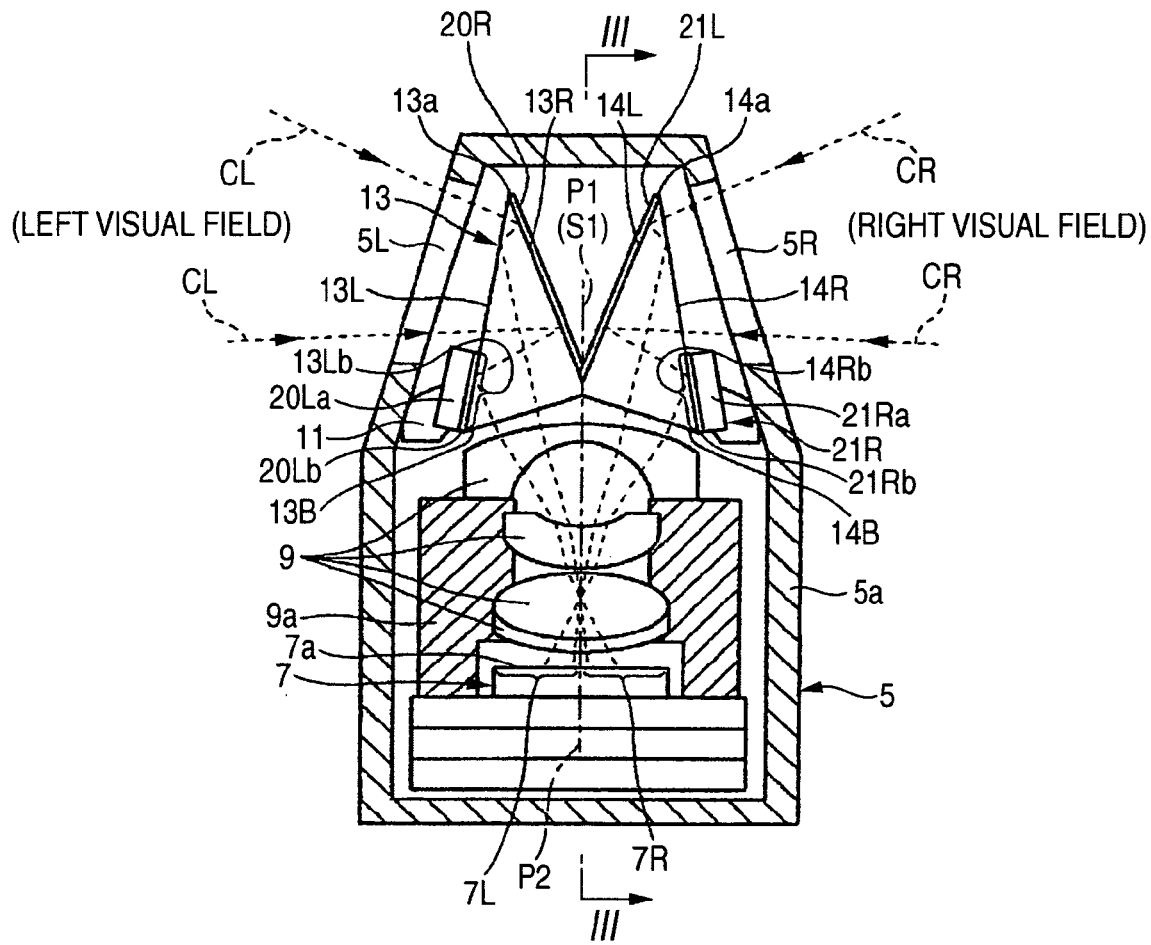
FIG. 7 is a schematic configuration view taken by viewing the camera device according to a modified embodiment from the top.
Figure 8:
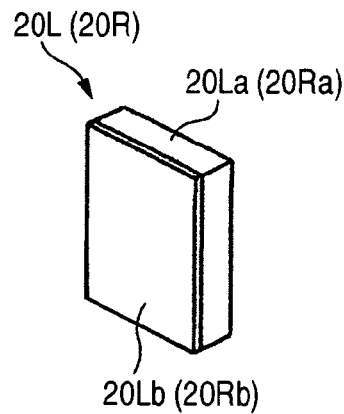
FIG. 8 is a perspective view of the second reflective member employed in the camera device in FIG. 7.
Figure 9:
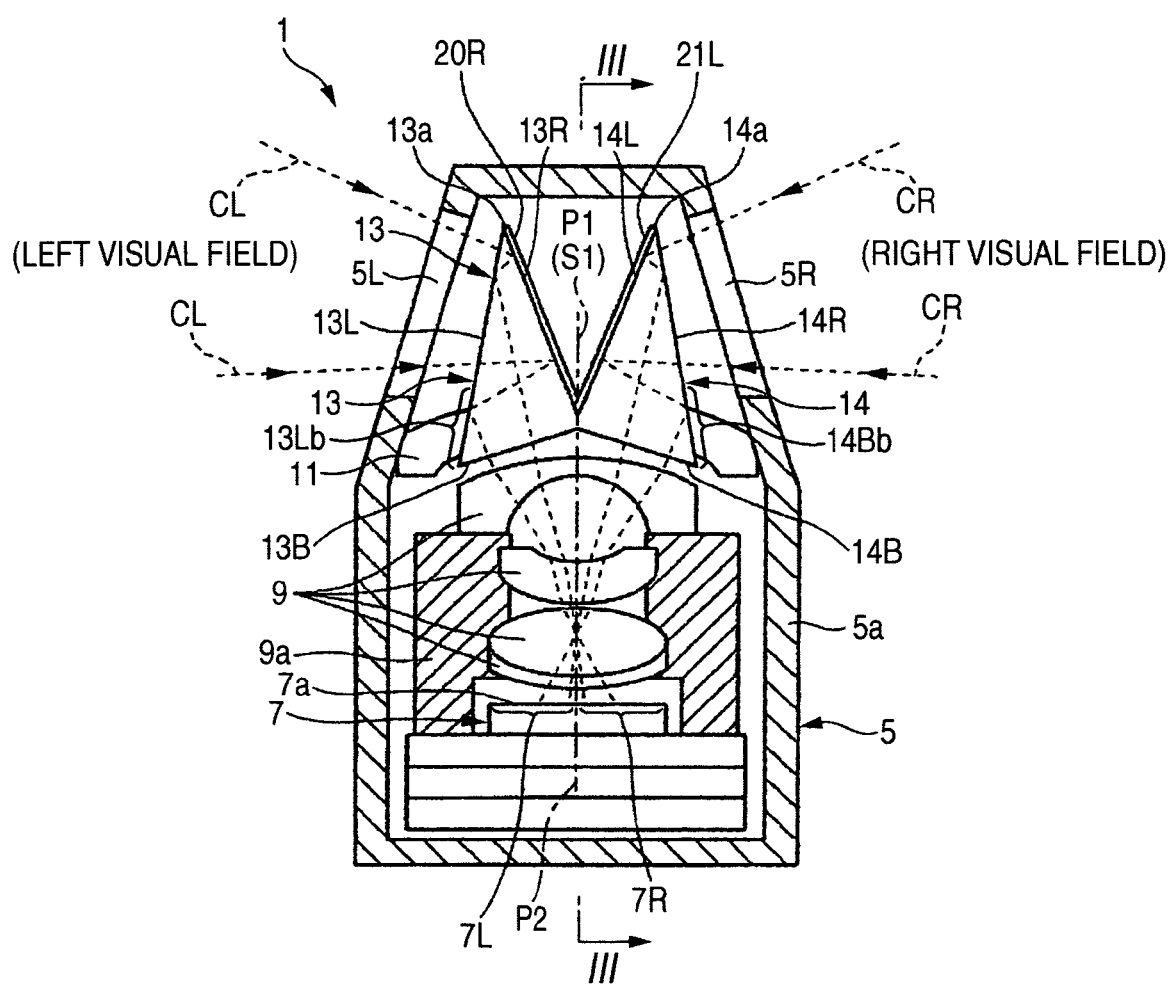
FIG. 9 is a schematic configuration view taken by viewing a camera device according to a conventional art from the top.
Figure 10:
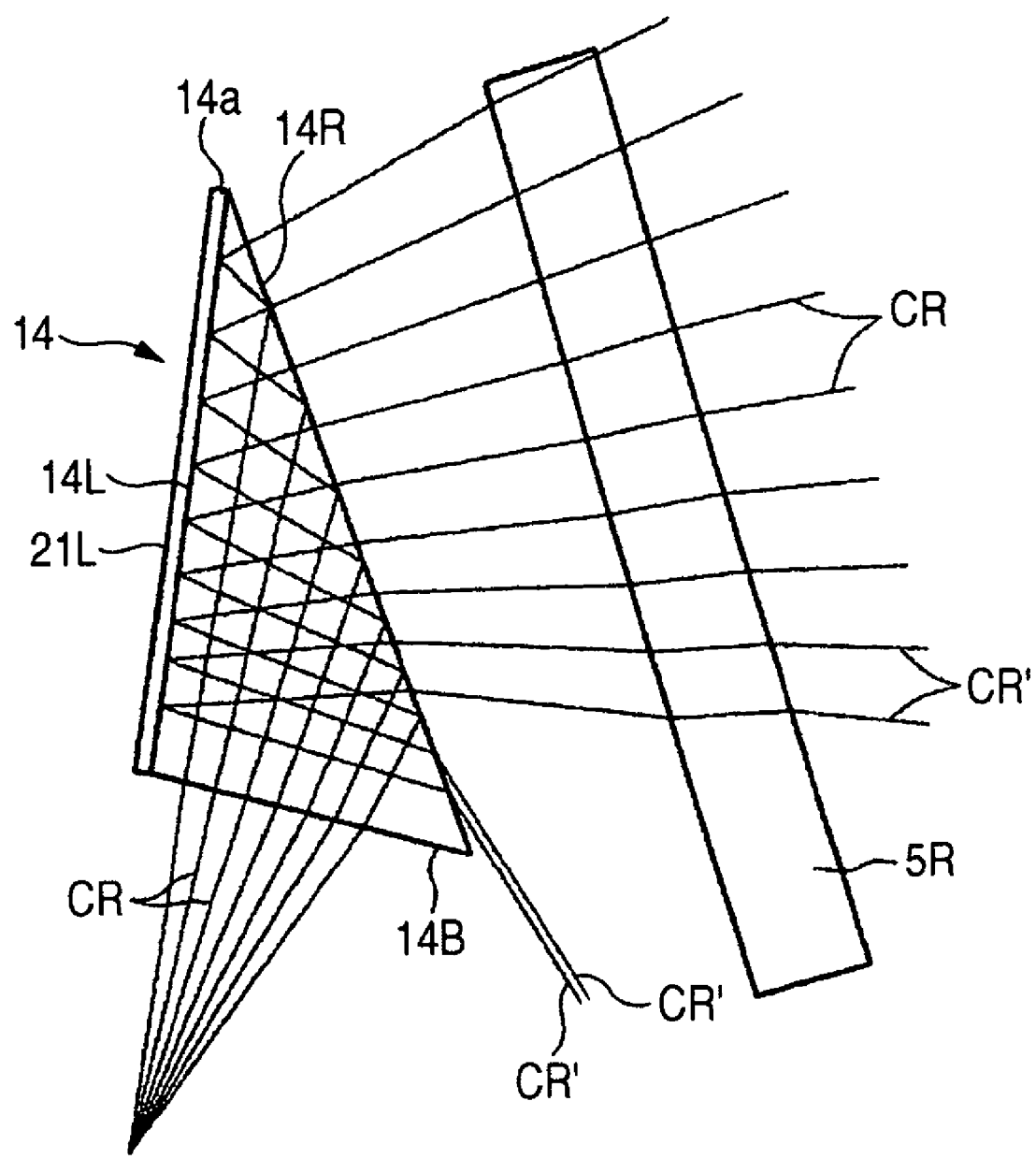
FIG. 10 is a view illustrating a state in which light incident on an inner surface of the prism side surface in the conventional camera device leaks out.
Figure 11:
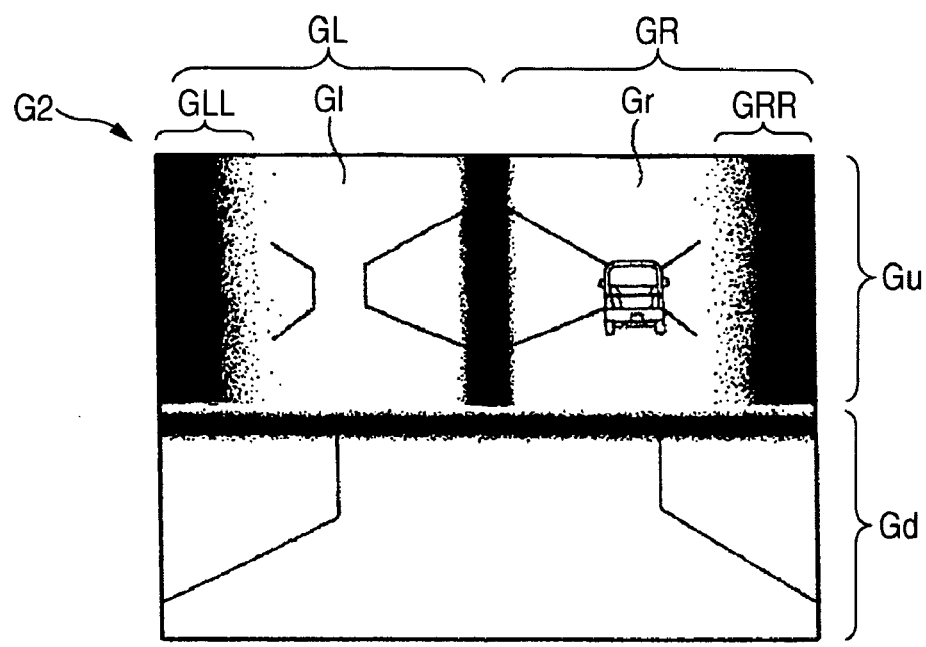
FIG. 11 is a view illustrating an example of an image pickup screen in a camera device in a related art.
Figure 12:
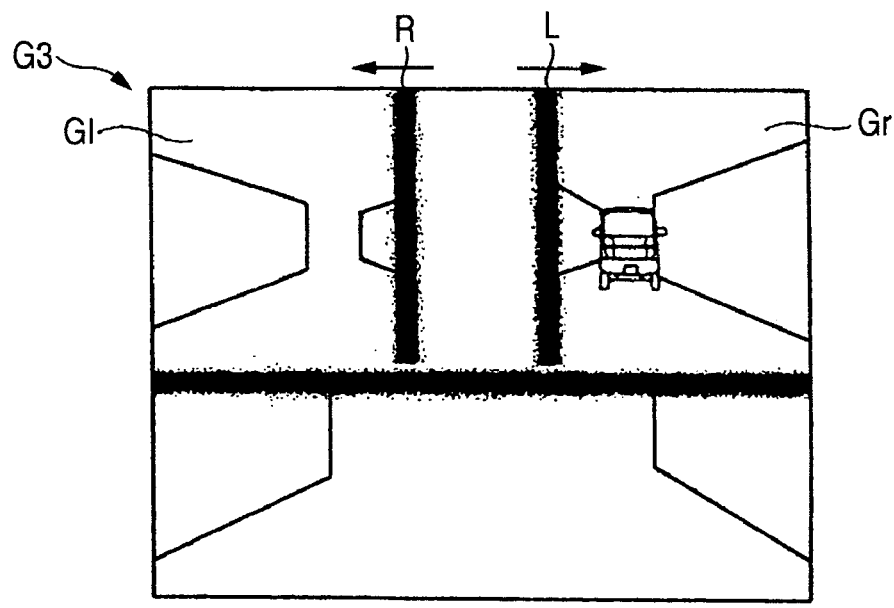
FIG. 12 is a view illustrating another example of an image pickup screen in the camera device in a related art.

In the above-described embodiment, the second reflective member 20L (21R) has a reflective film formed on the prism side surface 13L (14R) in the visual side. However, the second reflective member 20L (21R) is not limited to that construction. For example, as shown in FIGS. 7 and 8, the second reflective member 20L (21R) may be a reflective film 20Lb (21Rb) formed by depositing a metal such as aluminum on a substantially entire surface of a base material 20La (21Ra) made of a glass in the form of a rectangular plate and arranged on the prism side surface 13L (14R) in the visual field such that the reflective film 20Lb (21Rb) is adhered to the rear edge area 13Lb (14Rb) of the prism side surface 13L (14R) in the visual field. Otherwise, the second reflective film may be arranged close to the prism side surface 13L (14R) in the visual field such that the reflective film gets near the rear edge area 13Lb (14Rb) of the prism side surface 13L (14R) in the visual field.

Further, when the second reflective member 20L (21R) is arranged near the prism side surface 13L (14R) such that the reflective film 20Lb (21Rb) gets near the rear edge area 13Lb (14Rb) of the prism side surface 13L (14R) in the visual field, the second reflective member 20L (21R) is arranged to be fixed to, for example, an inner wall of the case 5a around the base material 20La (21Ra), the holder 9a, or the wide lens 11 through a predetermined fixing member.

Even in this case, there is an advantage that the second reflective member 20L (21R) can be formed by a simple construction.

What is claimed is:

1. A camera device comprising:
    an image pickup member having an image pickup element and an image pickup lens disposed on a front side of the image pickup element; and
    at least one substantially triangular prism disposed on a front side of the image pickup member, each prism having a rear surface facing the image pickup lens, one side surface disposed toward a visual field side in a direction substantially perpendicular to an optical image pickup axis, and the other side surface disposed toward an opposite visual field side, wherein light incident on the one side surface of prism is reflected twice between an inner surface of the other side surfaced of the prism and an inner surface of the one side surface of the prism,
    wherein the reflected light is emitted from the rear surface of the prism to form an image on an image pickup element through the image pickup lens,
    wherein a first reflective member disposed on substantially entire other side surface of the prism totally reflects the light incident on the inner surface of the other side prism, and
    wherein a second reflective member disposed on an area, of the one side surface of the prism, in which the light incident on the inner surface of the one side prism is not totally reflected, totally reflects the light incident on the inner surface of the one side prism.

2. The camera device according to claim 1, wherein the second reflective member is formed on a rear edge area of the one side of the prism.

3. The camera device according to claim 1, wherein the second reflective member is a reflective film formed on the one side of the prism.

4. The camera device according to claim 1, wherein the second reflective member has a reflective film formed on a surface of a base material,
    wherein the reflective film is adhered to the one side of the prism.

5. The camera device according to claim 1, wherein the at least one prism is configured by two prisms,
    wherein the two prisms are arranged in a plane symmetry with respect to a virtual plane including the optical camera axis of the image pickup member, and
    wherein the light incident from visual fields substantially opposite to each other imaged on the image pickup element through the image pickup lens by the two prisms.

6. The camera device according to claim 1, wherein the image pickup member focuses light guided by the prism from the visual field in a direction substantially perpendicular to an optical image pickup axis simultaneously with incident light that has not passed through the prism from the visual field at a front side of the image pickup member, on the image pickup element through the image pickup lens.

7. The camera device according to claim 1, wherein the camera device is arranged at an end of a vehicle, and
    wherein the camera device takes a peripheral image of the vehicle.

8. The camera device according to claim 1, wherein the second reflective member has a reflective film formed on a surface of a base material,
    wherein the reflective film is disposed in a vicinity of the one side of the prism.

* * * * *